/ Patented July 11, 1939

2,165,515

UNITED STATES PATENT OFFICE 2,165,515

PRODUCTION OF AMINES BY THE CATALYTIC HYDROGENATION OF NITRILES

Willi Schmidt, Ludwigshafen-on-the-Rhine, Germany, assignor to I. G. Farbenindustrie Aktiengesellschaft, Frankfort-on-the-Main, Germany No Drawing. Application May 5, 1937, Serial No. 140,889. In Germany May 18, 1933

16 Claims. (Cl. 260—583)

The present invention relates to a process of producing amines. It is a continuation-in-part of my application Ser. No. 725,480, filed on May 14, 1934.

I have found that amines are obtained in an advantageous manner by treating nitriles with hydrogen in the presence of catalysts comprising cobalt. A considerable advantage of the process consists in the fact that the nitriles are hydrogenated to a large degree so that usually no or practically no unconverted nitrile remains behind; a further advantage resides in the preferred formation of primary amines. The reaction is preferably carried out in the liquid phase and preferably under elevated pressure. Any nitriles, for example aliphatic, cycloaliphatic, aromatic or aliphatic-aromatic nitriles may be treated according to this invention, but it is of special advantage to start with aliphatic nitriles, preferably with high molecular aliphatic nitriles, for example those containing at least 6 carbon atoms, preferably from 8 to 28 carbon atoms in the molecule. Very suitable initial materials are for example the nitriles or mixtures of nitriles corresponding to the natural fatty acids, for example capric nitrile, lauric nitrile, myristic nitrile, palmitic nitrile, stearic nitrile, montanic nitrile, oleic nitrile, mixtures of nitriles of the fatty acids contained in the coconut oil, palm kernel oil, nitriles of the mono- and dicarboxylic acids resulting from the oxidation of paraffinic hydrocarbons such as paraffin wax and other waxes, dipropyl acetic nitrile and the like. Nitriles containing still further substituents in the molecule such as carboxylic and amino groups may also be employed. The said nitriles may be prepared according to different methods. For example nitriles containing an even number of carbon atoms in the molecule may be prepared from the corresponding natural fatty acids or their derivatives by treatment with ammonia in the presence of catalysts. Another method consists in treating acid amides with thionylchloride. Nitriles containing an uneven number of carbon atoms may be prepared for example by converting appropriate alkyl halides with alkali cyanides.

The term "aliphatic", as used in the definition of the nitriles in the claims, is meant to include cycloaliphatic.

The catalytic hydrogenation, for example of the said high molecular carboxylic acid nitriles, may be effected with advantage in the liquid phase for example at temperatures of about 100° C. In cases in which the hydrogenation does not go on very readily higher temperatures, for example up to about 300° C. may be employed. The process may be carried out under ordinary or preferably under increased pressure, for example above 25 atmospheres. The application of higher hydrogen pressures, for example up to 500 atmospheres and more is especially valuable in working at low temperatures. The hydrogen may be used alone or in admixture with other gases or vapors such as nitrogen, hydrocarbons or steam.

The hydrogenation of the nitriles in the presence of cobalt may be carried out in the presence of solvents whereby the course of the reaction may often be influenced; for example the amount of the primary amines formed may be increased to a certain extent by the addition of solvents. Some solvents react with the nitriles used, the amines formed or intermediate products. Thus for example in the hydrogenation of lauric nitrile in cyclohexanol, cyclohexyldodecylamine is formed.

It is a special advantage of the present process that high yields of primary amines are obtained by the single step of employing cobalt catalysts; any other measure such as the addition of acid anhydrides which favorizes the formation of primary amines but leads to acylated instead of free primary amines is not necessary.

The catalysts to be employed are characterized by the fact that they consist of or contain cobalt, preferably in the metallic or reduced state. The catalysts may be prepared by decomposing cobalt compounds with the formation of cobalt, for example by the pyrogenic decomposition of cobalt formate or by the reduction of inorganic cobalt compounds such as cobalt oxides, for example cobaltous hydroxide or cobalt carbonate, preferably by means of hydrogen. The catalysts may also be prepared by decomposition of alloys of cobalt with such elements as can be removed or converted into compounds by methods leaving the cobalt unattacked. For example cobalt-magnesium alloys may be decomposed by means of steam or alloys of cobalt with zink, aluminium or silicon may be decomposed with caustic alkali solutions. Any other way for preparing substances containing cobalt, may, however, also be used. In many cases it is advantageous to use cobalt together with other substances, for example together with other hydrogenating metals such as copper, or difficultly reducible metal oxides, or precipitated on carriers such as active carbon, silica gel, pumice stone, bleaching earths and the like. Usually it is preferable to employ the catalysts in a finely divided form, but grains or pieces may also be employed. The reduction of oxidic or like compounds to metallic cobalt may be effected before or during the reaction. The use of already reduced cobalt catalysts is advantageous in such cases in which the formation of primary amines with a content of secondary amines as low as possible is desired.

It is advantageous to mix the reacting substances intensely, for example by stirring or shaking or by allowing the materials to trickle over the catalyst formed to grains or by allowing a suspension of the finely divided catalyst in the reaction material to trickle over suitable filling materials such as Raschig rings, aluminum gravel and the like.

The amines obtainable according to the present invention may be employed as intermediate products in the production of assistants for the textile and related industries or of pharmaceutical preparations and the like. Many thereof are themselves suitable as assistants in the textile and related industries.

The following examples will further illustrate the nature of this invention, but the invention is not restricted to these examples. The parts are by weight.

Example 1

3 parts of stearic nitrile, 10 parts of cyclohexane and 1 part of a catalyst obtainable by reducing basic cobalt carbonate in a stream of hydrogen at 325° C., are treated at 100° C. in a stirring autoclave with hydrogen under a pressure of 200 atmospheres as long as hydrogen is still absorbed. The reaction product obtained is separated from the catalyst, the cyclohexane is distilled off and the mixture of amines is distilled in vacuo under a pressure of 2 millimeters. About 70 per cent of the reaction product distill between 158° and 163° C. (fraction 1), about 10 per cent between 268° and 270° C. (fraction 2), while about 19 per cent remain as a residue. Fraction 1 is pure primary stearyl amine, fraction 2 distearylamine. The catalyst may be used for further hydrogenations.

If instead of stearic nitrile a crude lauric nitrile be employed, dodecylamine (boiling between 140° and 170° C. under a pressure of 21 millimeters) in a yield of about 84 per cent and didodecylamine in a yield of about 13 per cent are obtained.

If stearic nitrile is hydrogenated under a hydrogen pressure of 25 atmospheres under otherwise the same conditions as indicated above, in the distillation in vacuo 63 per cent of stearylamine, 24 per cent of distearylamine and 13 per cent of a distillation residue containing amines are obtained.

Example 2

100 parts of crude lauric nitrile (boiling between 140° and 170° C. under a pressure of 15 millimeters and having a saponification number of 21) and 10 parts of a catalyst prepared as described in Example 1 are treated in a stirring autoclave with hydrogen under a pressure of from 150 to 200 atmospheres until hydrogen is no longer absorbed.

More than 80 per cent of the crude reaction product distill over in a vacuum of 19 millimeters between 120° and 150° C. The distillate is practically pure dodecylamine.

Example 3

200 parts of cyclohexanol, 30 parts of lauric nitrile having the same characteristics as the material used according to the preceding example and 10 parts of a non-reduced cobalt catalyst (obtainable by heating basic cobalt carbonate for four hours at 350° C.) are treated with hydrogen under a pressure of 250 atmospheres at 230° C. Cyclohexyldodecylamine is obtained in a good yield.

Example 4

8.73 kilograms of crystallized cobalt nitrate, 11.25 kilograms of crystallized aluminum nitrate and 0.06 kilogram of barium nitrate are dissolved in 60 litres of water. The hydroxides or carbonates of the metals are precipitated by means of a solution of 13.44 kilograms of sodium bicarbonate in 160 litres of water. The precipitate is washed, filtered and reduced in a stream of hydrogen at about 350° C.

200 parts of oleic nitrile and 10 parts of the catalyst obtained according to the preceding paragraph are treated at from 130° to 140° C. in a stirring autoclave with hydrogen of 150 atmospheres. The crude mixture of amines is freed from the catalyst and by fractional distillation 30 per cent (of the theoretical amount) of stearylamine and 65 per cent of distearylamine are obtained. By variation of the conditions it is possible to convert oleic nitrile into the corresponding amine without hydrogenation of the double linkage in the carbon chain.

Example 5

A solution of 1 molecular proportion of copper nitrate and 1 molecular proportion of manganese nitrate is precipitated with a solution of sodium bicarbonate. The precipitate is washed, dried and heated to 400° C. 200 parts of cobalt carbonate, 100 parts of the copper-manganese catalyst described above and 300 parts of water are handled for one hour in a ball-mill. The catalyst is dried, powdered and reduced in a stream of hydrogen at 350° C.

A mixture of nitriles corresponding to the fatty acids contained in the coconut oil is reduced in the presence of 5 per cent of the said catalyst at 125° C. under a hydrogen-pressure of 100 atmospheres. A mixture of amines is obtained in 78 per cent of the theoretical yield which corresponds to the mixture of nitriles employed and which distills between 70° and 210° C. under a pressure of 15 millimeters mercury gauge.

Instead of the nitriles from coconut oil those obtainable from the mixtures of the acids resulting from the oxidation of paraffinic hydrocarbons (such as paraffin wax) may be treated under the same conditions whereby the corresponding amines are obtained in a yield of about 80 per cent.

Example 6

7.5 parts of a powdered cobalt-aluminium-alloy containing 20 per cent of cobalt are added to 150 parts of a 10 per cent caustic soda solution while stirring. The solid residue is separated from the aqueous solution and washed until neutral. The water contained in the paste is replaced by methanol.

The catalyst thus obtained is mixed with 100 parts of benzyl cyanide and the mixture is heated at 80° C. in a high-pressure autoclave under a hydrogen-pressure of 200 atmospheres until hydrogen is no longer absorbed which is the case after about 10 hours. The reaction product is freed from the catalyst and subjected to distillation in vacuo. 84 parts of β-phenyl-ethyl amine

Example 7

To 250 parts of basic cobalt carbonate distributed in 1000 parts of water a solution of 30 parts of sodium ammonium tungstate in 200 parts of water is added while stirring; the solid parts are filtered off by suction, dried without washing and reduced with hydrogen at 325° C.

100 parts of a naphthenic acid nitrile mixture (which boils between 80° and 220° C. under a pressure of 20 millimeters (mercury gauge) and contains 6.5 per cent of nitrogen) and 5 parts of the catalyst obtained according to the first paragraph are heated together for about 5 hours at 110° C. under a hydrogen-pressure of 200 atmospheres. The reaction product is freed from the catalyst and distilled in vacuo. 83 parts of a naphthenyl amine mixture boiling between 55° and 180° C. under a pressure of 11 millimeters (mercury gauge) and containing 6.5 per cent of basic nitrogen are obtained.

Example 8

100 parts of abietic acid nitrile boiling between 170° and 180° C. under a pressure of 0.5 millimeter (mercury gauge) and containing 4.8 per cent of nitrogen, 10 parts of a cobalt catalyst (obtained by reducing basic cobalt carbonate with hydrogen at 325° C.) and 100 parts of methanol are heated together at 110° C. in a high-pressure autoclave under a hydrogen-pressure of 200 atmospheres until hydrogen is no longer absorbed which requires about 5 hours. The reaction product is separated from the catalyst, freed from methanol by distilling off the latter and subjected to distillation in a high vacuo. 75 parts of abietyl amine boiling between 203° and 210° C. under a pressure of 2.5 millimeters (mercury gauge) and containing 4.7 per cent of basic nitrogen are obtained.

Example 9

100 parts of benzoic nitrile and 3 parts of the cobalt catalyst referred to in Example 8 are heated together for about 8 hours at 110° C. in a high-pressure autoclave under a hydrogen-pressure of 200 atmospheres. By distilling the reaction product which has been freed from the catalyst 85 parts of benzyl amine are obtained.

Example 10

100 parts of N-dodecyl-3-amino propionitrile corresponding to the formula $C_{12}H_{25}$—NH—$CH_2$—$CH_2$—CN

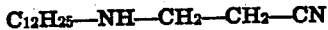

and a catalyst obtained from 7.5 parts of a cobalt-aluminium-alloy according to the first paragraph of Example 6 are heated together for about 8 hours at 80° C. in a high-pressure autoclave under a hydrogen-pressure of 200 atmospheres. The reaction product is freed from the catalyst and distilled in a high vacuo. 85 parts of N-dodecyl propylene diamine-(1.3) corresponding to the formula $C_{12}H_{25}$—NH—$CH_2$—$CH_2$—$CH_2$—$NH_2$ boiling between 150° and 153° C. under a pressure of 0.8 millimeter (mercury gauge) are obtained.

What I claim is:

1. The process of producing amines corresponding to the formula R—$CH_2$—$NH_2$ which consists of causing a nitrile corresponding to the formula R—C≡N wherein R is a member of the group consisting of aliphatic, aromatic, and aliphatic-aromatic residues with at least 5 carbon atoms free from hydroxy groups, to react with hydrogen in the presence of a catalyst comprising essentially cobalt.

2. The process of producing amines corresponding to the formula R—$CH_2$—$NH_2$ which consists of heating a nitrile corresponding to the formula R—C≡N wherein R is a member of the group consisting of aliphatic, aromatic and aliphatic-aromatic residues with at least 5 carbon atoms free from hydroxy groups with hydrogen in the presence of a catalyst comprising essentially cobalt to a temperature between about 50° and about 300° C.

3. The process of producing amines corresponding to the formula R—$CH_2$—$NH_2$ which consists of heating a nitrile corresponding to the formula R—C≡N wherein R is a member of the group consisting of aliphatic, aromatic and aliphatic-aromatic residues with at least 5 carbon atoms free from hydroxy groups with hydrogen under a pressure of from 25 to 500 atmospheres in the presence of a catalyst comprising essentially cobalt to a temperature between about 50° and about 300° C.

4. The process of producing amines corresponding to the formula R—$CH_2$—$NH_2$ which consists of heating a nitrile corresponding to the formula R—C≡N wherein is a member of the group consisting of aliphatic, aromatic and aliphatic-aromatic residues with at least 5 carbon atoms free from hydroxy groups with hydrogen in the liquid phase under a pressure of from 25 to 500 atmospheres in the presence of a catalyst comprising essentially cobalt to a temperature between about 50° and about 300° C.

5. The process of producing amines corresponding to the formula R—$CH_2$—$NH_2$ which consists of causing a nitrile corresponding to the formula R—C≡N wherein R is a member of the group consisting of aliphatic, aromatic and aliphatic-aromatic residues with at least 5 carbon atoms free from hydroxy groups, to react with hydrogen in the presence of an inert solvent and a catalyst comprising essentially cobalt.

6. The process of producing amines corresponding to the formula R—$CH_2$—$NH_2$ which consists of heating a nitrile corresponding to the formula R—C≡N wherein R is a member of the group consisting of aliphatic, aromatic and aliphatic-aromatic residues with at least 5 carbon atoms free from hydroxy groups, with hydrogen in the presence of an inert solvent and a catalyst comprising essentially cobalt to a temperature between about 50° and about 300° C.

7. The process of producing amines corresponding to the formula R—$CH_2$—$NH_2$ which consists of causing a nitrile corresponding to the formula R—C≡N wherein R is an aliphatic radicle with at least 5 carbon atoms free from hydroxy groups, to react with hydrogen in the presence of a catalyst comprising essentially cobalt.

8. The process of producing amines corresponding to the formula R—$CH_2$—$NH_2$ which consists of heating a nitrile corresponding to the formula R—C≡N wherein R is an aliphatic radicle with at least 5 carbon atoms free from hydroxy groups, with hydrogen in the liquid phase in the presence of a catalyst comprising essentially cobalt to a temperature between about 50° and about 300° C.

9. The process of producing amines corresponding to the formula R—$CH_2$—$NH_2$ which consists of heating a nitrile corresponding to the formula R—C≡N wherein R is an aliphatic radicle with at least 5 carbon atoms free from hydroxy groups, with hydrogen in the liquid phase under a pressure of from 25 to 500 atmospheres in the presence of a catalyst comprising essentially cobalt to a temperature between about 50° and about 300° C.

10. The process of producing amines corresponding to the formula R—CH$_2$—NH$_2$ which consists of heating a nitrile corresponding to the formula R—C≡N wherein R is an aliphatic radicle with from 7 to 27 carbon atoms free from hydroxy groups, with hydrogen in the liquid phase under a pressure of from 25 to 500 atmospheres in the presence of a catalyst comprising essentially cobalt to a temperature between about 50° and about 300° C.

11. A process of producing primary amines which consists of heating a nitrile containing at least 6 carbon atoms in the molecule and being free from hydroxy groups in the liquid phase with hydrogen under a pressure of from 25 to 500 atmospheres in the presence of a catalyst consisting mainly of cobalt to a temperature between about 70° and about 150° C.

12. A process of producing primary aliphatic amines which consists of heating an aliphatic nitrile containing at least 6 carbon atoms in the molecule and being free from hydroxy groups in the liquid phase with hydrogen under a pressure of from 25 to 500 atmospheres in the presence of a catalyst consisting mainly of cobalt to a temperature between about 70° and about 150° C.

13. The process of producing amines which consists of heating a mixture of nitriles of naturally occurring fatty acids each of which nitriles contains at least 6 carbon atoms per molecule and is free from hydroxy groups, with hydrogen in the presence of a catalyst comprising essentially cobalt to a temperature between about 50° and about 300° C.

14. The process of producing amines which consists of heating a mixture of nitriles of naturally occurring fatty acids each of which nitriles contains at least 6 carbon atoms per molecule and is free from hydroxy groups, with hydrogen under a pressure of from 25 to 500 atmospheres in the presence of a catalyst comprising essentially cobalt to a temperature between about 50° and about 300° C.

15. The process of producing amines which consists of heating a mixture of nitriles of fatty acids resulting from the oxidation of high molecular paraffinic hydrocarbons each of which nitriles contains at least 6 carbon atoms per molecule and is free from hydroxy groups, with hydrogen in the presence of a catalyst comprising essentially cobalt to a temperature between about 50° and about 300° C.

16. The process of producing amines which consists of heating a mixture of nitriles of fatty acids resulting from the oxidation of high molecular paraffinic hydrocarbons each of which nitriles contains at least 6 carbon atoms per molecule and is free from hydroxy groups, with hydrogen under a pressure of from 25 to 500 atmospheres in the presence of a catalyst comprising essentially cobalt to a temperature between about 50° and about 300° C.

WILLI SCHMIDT.